United States Patent
Roessner et al.

[11] Patent Number: 5,873,644
[45] Date of Patent: Feb. 23, 1999

[54] READING LAMP SYSTEM FOR PASSENGERS ESPECIALLY IN AN AIRCRAFT

[75] Inventors: Bernd Roessner, Rosengarten; Wilfried Sprenger, Issendorf, both of Germany

[73] Assignee: Daimler-Benz Aerospace Airbus GmbH, Hamburg, Germany

[21] Appl. No.: 815,569

[22] Filed: Mar. 12, 1997

[30] Foreign Application Priority Data

Mar. 15, 1996 [DE] Germany ............ 196 10 138.7

[51] Int. Cl.⁶ .................................... F21V 7/04

[52] U.S. Cl. .............. 362/32; 362/62; 362/275; 362/84; 349/1

[58] Field of Search ............... 349/1, 61; 362/32, 362/275, 84, 62

[56] References Cited

U.S. PATENT DOCUMENTS

| | | | |
|---|---|---|---|
| 3,285,130 | 11/1966 | Cocca et al. ........................ | 362/32 |
| 3,536,908 | 10/1970 | Oster . | |
| 3,924,115 | 12/1975 | Hampton et al. ................... | 362/32 X |
| 4,152,752 | 5/1979 | Niemi ................................. | 362/32 |
| 4,388,678 | 6/1983 | Turner ................................ | 362/293 |
| 4,811,172 | 3/1989 | Davenport et al. ................ | 362/32 |
| 4,930,049 | 5/1990 | Davenport et al. ................ | 362/32 |
| 4,958,263 | 9/1990 | Davenport et al. ................ | 362/32 |
| 5,184,883 | 2/1993 | Finch et al. ....................... | 362/32 |
| 5,278,731 | 1/1994 | Davenport et al. ................ | 362/32 |
| 5,303,125 | 4/1994 | Miller ................................ | 362/32 |
| 5,311,410 | 5/1994 | Hsu et al. .......................... | 362/32 |
| 5,313,726 | 5/1994 | Yaniv et al. ....................... | 40/361 |
| 5,325,272 | 6/1994 | Miller ................................ | 362/32 |
| 5,377,087 | 12/1994 | Yoon ................................. | 362/275 |
| 5,452,186 | 9/1995 | Dassanyake ...................... | 362/32 |
| 5,677,603 | 10/1997 | Speirs et al. ...................... | 362/32 X |

FOREIGN PATENT DOCUMENTS 3824371  9/1989  Germany .

*Primary Examiner*—Ira S. Lazarus
*Assistant Examiner*—David Lee
*Attorney, Agent, or Firm*—W. F. Fasse; W. G. Fasse

[57] ABSTRACT

A reading lamp system for passengers especially in an aircraft is equipped with at least one central light source preferably including a cool light lamp, the light of which is supplied through light guides such as fiber optical conductors, to individual reading lamps having a housing to which the respective light guide is connected. A liquid crystal film is positioned in the lamp housing between the light exit of the respective light guide and a lens that provides a light output from the reading lamp housing. The liquid crystal film is controllable in its light transparency by a passenger through a switch, whereby the passenger can make the liquid crystal film opaque to switch off the reading lamp or transparent to switch on the lamp. A dimmer may also be arranged to provide intermediate light level illuminations.

15 Claims, 1 Drawing Sheet

READING LAMP SYSTEM FOR PASSENGERS ESPECIALLY IN AN AIRCRAFT

FIELD OF THE INVENTION

The invention relates to a reading lamp system that provides individual reading lamps for passengers especially in an aircraft cabin. However, the present reading lamp system is also suitable for passenger railroad car compartments, buses, and the like.

BACKGROUND INFORMATION

German Patent Publication DE 3,824,371 A1 (Aqua Signal AG), published on Sep. 14, 1989, discloses an illuminating device particularly for ships and aircraft. Lighting fixtures of the known system are connected through fiber optical conductors, through an optical system, and through a filter to a high power point light source which in turn is connected through electrical conductors to a power source such as the onboard electrical power supply. The filter eliminates from the spectrum emitted by the high power light source those wave lengths that do not contribute to the visible light spectrum, whereby only visible light enters into the fiber optical cable. The known system aims at reducing maintenance work on external signal lights in aircraft and ships. All lamps supplied by the same light source are switched on or off in unison by controlling the central light source.

U.S. Pat. No. 3,536,908 (Oster), issued on Oct. 27, 1907, discloses a fiber optic lighting system with bundles of fiber optical conductors which may have different lengths to feed light to individual reflectors forming light outputs. Each light output has a convex reflector held in a concave reflector. A transparent rotatable disc having sectors of different colors is positioned so that the sectors can be rotated into a light path from the light source to the inlets of the optical fiber conductor bundles. The disc is rotatable by a motor. The Oster system is especially suitable as an ornamental lighting system for trees or for display presentations. Again, all light ouputs are only switchable in unison.

The prior art discussed above does not address the problem of providing an efficient illumination for individual passenger seats to increase the passenger comfort, for example, in an aircraft passenger cabin. Conventionally, each passenger seat is illuminated by a lighting fixture including an incandescent bulb and a respective lens system installed overhead, whereby the passenger can operate a switch to activate or deactivate the individual seat or reading lamp. Some conventional incandescent bulb reading lamps with a reflector are position adjustable so that the passenger can direct the light beam to a desired area.

Conventional passenger reading lamps with incandescent bulbs have several disadvantages. Generally the incandescent bulbs require a voltage different from that of the onboard power supply network so that at least one transformer or many smaller transformers are required, generally one for each lamp unit. The total number of transformers adds to the weight of the lighting system. Further, the efficiency of incandescent light bulbs is low and unsatisfactory even if halogen lamps are used. Moreover, the exchange of defective incandescent bulbs involves a substantial maintenance effort and expense. Additionally, lighting fixtures with incandescent bulbs require a substantial space above the passenger seat. Thus, there is room for improvement.

OBJECTS OF THE INVENTION

In view of the above it is the aim of the invention to achieve the following objects singly or in combination:

to provide a reading light system particularly for increasing the passenger comfort whereby the system simultaneously avoids the above outlined disadvantages of the prior art incandescent bulb lighting systems;

to supply reading lights for many passenger seats with light from a common, central light source while still permitting each passenger to switch her or his reading light on or off and to select the most convenient illumination level;

to install the common, central light source for easy access so that maintenance work is facilitated.

SUMMARY OF THE INVENTION

The lighting system according to the invention is characterized in that a central light source cooperates with a decoupling optical device for feeding light from the central source, which is preferably a cool light source, through a multitude of light guides such as fiber optical light conductors, to respective reading lamps, wherein each lamp has a housing with an inlet for the respective light guide or fiber optical conductor, wherein a switchable liquid crystal film is arranged in the housing for switching the light on or off by switching the liquid crystal film either opaque or transparent so that light can exit through an exit optical device mounting in a housing exit when the film is transparent and so that light is blocked when the liquid crystal film is opaque.

It is a particular advantage of the invention that its efficiency and reliability is substantially increased compared to systems with incandescent lamps. Other important advantages are seen in the reduction of the space requirement and in the weight reduction. Moreover, involved cooling requirements are avoided by the elimination of incandescent individual reading light bulbs and also by the use of a central cool light source.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
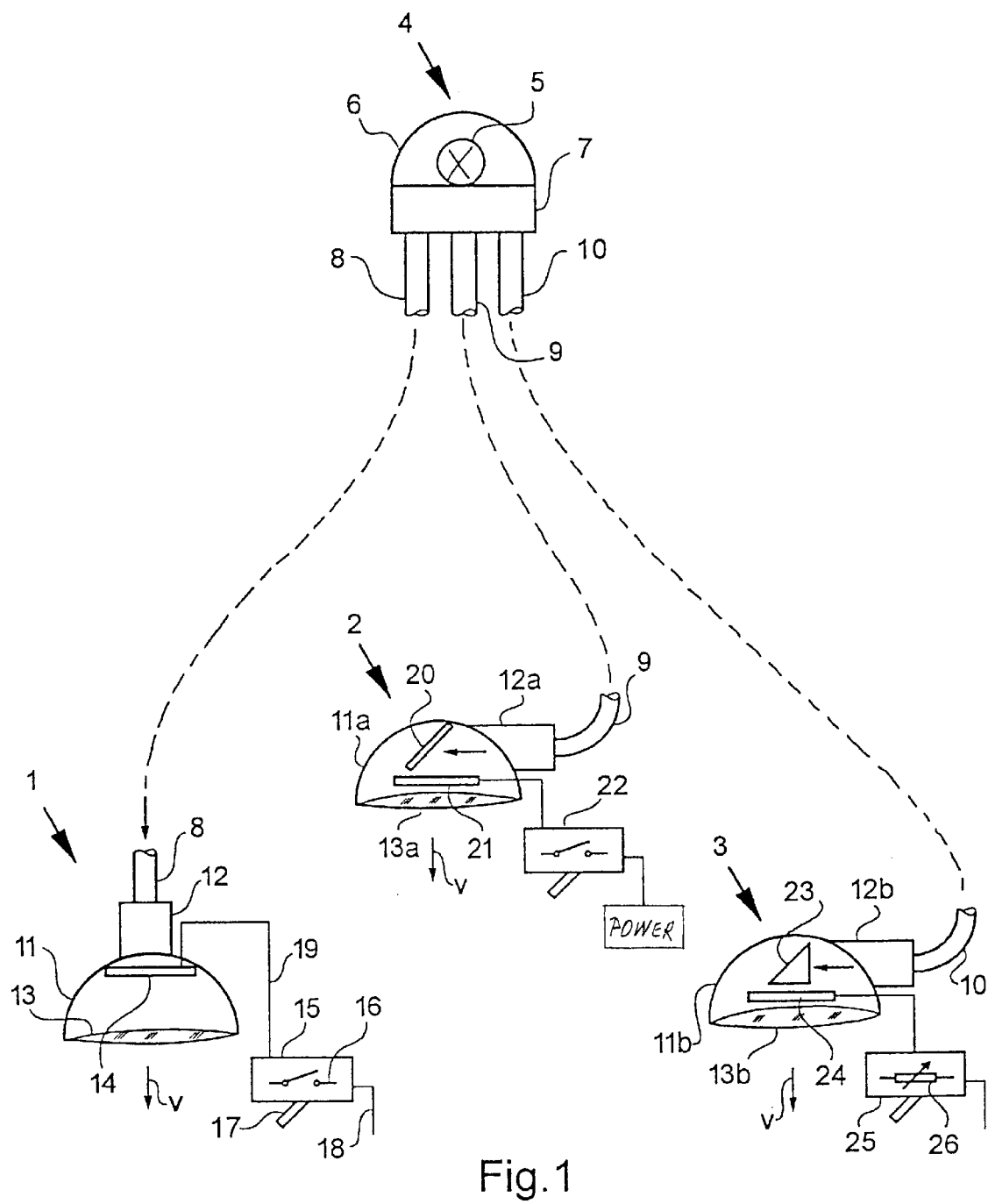
FIG. 1 is a schematic illustration of the present reading light system with a liquid crystal film used as a switch for individual light outputs.

FIG. 1 shows a reading lamp system of the invention with, for example, three light outputs referred to as reading lamps 1, 2, and 3. However, the number of reading lamps is not critical and will depend on the light output capacity of a central light source 4 preferably comprising a cool light lamp 5 in a housing forming or including a reflector 6 and an output or decoupling optical device 7 such as a lens or lenses. Each reading lamp 1, 2, 3 is connected to the light source through its own optical fiber light conductor or cable 8, 9, and 10. These flexible optical fiber light conductors are covered with individual protection jackets and transmit the light from the light source 5 to the individual reading lamps. Various types of cool light lamps can be used for the light source 5. One example is on the market as Model D1 manufactured by Osram. Various types of gas discharge lamps, such as fluorescent lamps, are useable for the present purpose.

Each reading lamp 1, 2, 3 comprises a housing 11, 11A, 11B respectively, whereby the housing has preferably an approximately hemispherical configuration provided with a cable inlet 12, 12A, 12B for the respective light conductor cable 8, 9, and 10. Inlet 12 is positioned coaxially to a central rotational axis of the housing 11. Inlets 12A and 12B are positioned at a right angle relative to the central housing axis. An optical device 13, 13A, 13B is arranged in the respective housing for defining a light cone or beam that exits from the respective lamp housing as indicated by the arrows V. The optical device 13, 13A, 13B such as a lens, prism or the like is so constructed that it provides a light cone or beam for the respective passenger seat.

Referring further to FIG. 1, the cable inlet 12 of the lamp 1 is arranged approximately coaxially to a vertical central axis of the housing 11, whereby this axis is positioned vertically in the plane of the drawing sheet. The light from the light conductor 8 enters the housing 11 in a vertical direction downwardly. A liquid crystal film 14 is mounted in the housing 11 in the light path between the exit end of the conductor 8 and the optical device 13 for switching the light on and off, or rather for blocking or opening the light path by switching the liquid crystal panel 14 to be either opaque or transparent. Furthermore, the light intensity can be adjusted by using liquid crystal panels having a light passage characteristic that varies with the applied voltage. For this purpose a control unit 15 with a switch 16 to be operated by a passenger through a handle 17 is connected through conductors 18 and 19 to an onboard power supply. This feature enables the passenger to individually control his reading light, whereby a dimmer 25 shown for the lamp 3 with an adjustable resistor 26 may be used.

The reading lamp 2 has a light cable inlet 12A that extends at an angle of approximately 90° relative to the light exit direction V. The incoming light is deflected by a mirror 20 to pass through a liquid crystal film or panel 21 and through the optical device 13A. The liquid crystal film or panel 21 is again controlled through a switch 22 in its ability to pass or block light. The construction of the lamp 2 is especially advantageous because it can be installed where limited space is available.

The lamp 3 has substantially the same construction as the lamp 2, however the mirror 20 has been replaced by a prism 23 while the light cable inlet 12B is also arranged at a right angle to the light exit direction V. The light passage or blocking capacity of the liquid crystal panel 24 is controlled by a dimmer 25 with an adjustable resistor 26 manually controllable by the passenger for adjusting or dimming the light output of the lamp 3 or to switch it off altogether.

Contrary to the left-hand part of FIG. 1, in the central and right-hand part of FIG. 1 the light conductor cable inlets 12A and 12B of the lamps 2 and 3 extend at an angle other than 180° relative to the central vertical axis of the respective lamp housing 11A, 11B, for example at about 90°.

Figure 2:
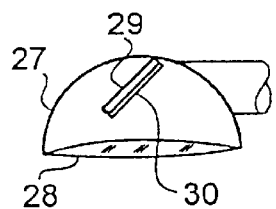
FIG. 2 shows a modified position of the liquid crystal film switch in the light output.

FIG. 2 shows a reading lamp with a housing 27 and an optical exit lens 28 including a mirror 29 similar to the mirror 20 of the lamp 2, however, the mirror 29 is combined with the liquid crystal panel or film 30 which is directly connected to the mirror 29.

Figure 3:
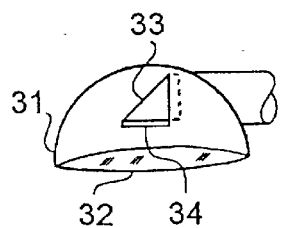
FIG. 3 shows the combination of the liquid crystal film switch with a prism in the individual light output.

FIG. 3 illustrates the replacement of the mirror 29 by a prism 33 in a housing 31, whereby the liquid crystal film 34 is attached to one side of the prism 33 facing the exit lens 32. However, the liquid crystal film 34 could alternatively be positioned on the light entrance side of the prism 33 as shown by a dashed line of the prism.

As mentioned above, the number of lamps 1, 2, 3 that can be supplied by a single central light source will depend on the light output capacity of the central light source. If necessary, a plurality of light sources may be arranged in different cabin sections of the aircraft, for example. In any event, these central light sources will be positionable in easily accessible locations to thereby facilitate maintenance work. Moreover, by the preferred use of a cool light lamp 5 very little waste energy is radiated, whereby the cooling requirements are substantially reduced or eliminated. Light guides other than fiber optical light conductors can be used for the present purposes, such as tubular light conductors. However, flexible fiber optical conductors such as glass fibers are preferred.

Although the invention has been described with reference to specific example embodiments, it will be appreciated that it is intended to cover all modifications and equivalents within the scope of the appended claims.

What is claimed is:

1. An aircraft comprising a cabin lighting system including a reading lamp for each passenger seat, said lighting system comprising a central light source (4), a light decoupling optical device (7), individual light wave conductors (8 to 10) arranged for receiving light from said light decoupling device and feeding light to said reading lamps, wherein each reading lamp comprises a housing having a central axis and including a light conductor cable inlet for a respective light wave conductor of said light wave conductors, said light conductor cable inlet extending at an angle other than 180° relative to said central axis of said housing, an optical light output, a liquid crystal film arranged in said housing between a light exit of said respective light wave conductor and said optical light output of said housing, a power supply circuit including a switch for connecting said liquid crystal film to a power source for controlling said liquid crystal film to be opaque or transparent for switching said reading lamp off or on.

2. A reading lamp system for passenger seats, comprising a central light source (4), a light decoupling optical device (7), a plurality of reading lamps (1, 2, 3), individual light wave conductors (8 to 10) arranged for receiving light from said light decoupling device and feeding light to said reading lamps, wherein each reading lamp comprises a housing including a cable inlet for a respective light wave conductor of said light wave conductors, an optical light output, a liquid crystal film arranged in said housing between a light exit of said respective light wave conductor and said optical light output of said housing, a power supply circuit including a switch for connecting said liquid crystal film to a power source for controlling said liquid crystal film to be opaque or transparent for switching said reading lamp off or on, wherein said cable inlet of said housing is positioned at an angle of about 90° relative to a rotational axis of said housing and further comprising a mirror positioned in said housing to reflect incoming light from said respective light wave conductor to said optical light output of said housing.

3. The reading lamp system of claim 2, wherein said liquid crystal film is secured to a reflective surface of said mirror.

4. A reading lamp system for passenger seats, comprising a central light source (4), a light decoupling optical device (7), a plurality of reading lamps (1, 2, 3), individual light wave conductors (8 to 10) arranged for receiving light from said light decoupling device and feeding light to said reading lamps, wherein each reading lamp comprises a housing including a cable inlet for a respective light wave conductor of said light wave conductors, an optical light output, a liquid crystal film arranged in said housing between a light exit of said respective light wave conductor and said optical light output of said housing, a power supply circuit including a switch for connecting said liquid crystal film to a power source for controlling said liquid crystal film to be opaque or transparent for switching said reading lamp off or on, wherein said cable inlet of said housing is positioned at an angle of about 90° relative to a rotational axis of said housing, and further comprising a prism arranged in said housing for deflecting light coming from said respective light wave conductor to said optical light output of said housing.

5. The reading lamp system of claim 4, wherein said liquid crystal film is secured to a light exit surface of said prism.

6. The reading lamp system of claim 5, wherein said liquid crystal film is arranged on a light entrance surface of said prism.

7. The reading lamp system of claim 1, wherein said central light source comprises a cool light lamp.

8. The reading lamp system of claim 1, further comprising a dimmer in said power supply circuit.

9. The reading lamp system of claim 1, wherein said light wave conductors comprise flexible optical fiber light conductors between said central light source and said reading lights.

10. The reading lamp system of claim 2, wherein said central light source comprises a cool light lamp.

11. The reading lamp system of claim 2, further comprising a dimmer in said power supply circuit.

12. The reading lamp system of claim 2, wherein said light wave conductors comprise flexible optical fiber light conductors between said central light source and said reading lights.

13. The reading lamp system of claim 4, wherein said central light source comprises a cool light lamp.

14. The reading lamp system of claim 4, further comprising a dimmer in said power supply circuit.

15. The reading lamp system of claim 4, wherein said light wave conductors comprise flexible optical fiber light conductors between said central light source and said reading lights.

* * * * *

UNITED STATES PATENT AND TRADEMARK OFFICE
CERTIFICATE OF CORRECTION

PATENT NO. : 5,873,644

DATED : Feb. 23, 1999

INVENTOR(S) : Roessner et al.

It is certified that error appears in the above-identified patent and that said Letters Patent is hereby corrected as shown below:

Col. 3, line 33, after "of" insert --about or--,

Col. 3, line 34, after "V." insert --The terms "about" or "approximately" are intended to refer to angle deviations from 90° within the range of acceptable engineering tolerances.--

Signed and Sealed this

Third Day of August, 1999

Attest:

Attesting Officer

Q. TODD DICKINSON

Acting Commissioner of Patents and Trademarks